United States Patent
Wize

[11] 3,727,944
[45] Apr. 17, 1973

[54] CONTROL BELT SYSTEM FOR A VEHICLE BODY OCCUPANT RESTRAINING BELT ARRANGEMENT

[75] Inventor: Gary A. Wize, Washington, Mich.
[73] Assignee: General Motors Corporation, Detroit, Mich.
[22] Filed: July 28, 1971
[21] Appl. No.: 166,799

[52] U.S. Cl. ..........................................280/150 SB
[51] Int. Cl. ..............................................B60r 21/10
[58] Field of Search..................280/150 SB; 297/388

[56] References Cited

UNITED STATES PATENTS 3,583,726  1/1971  Lindblad........................280/150 SB

*Primary Examiner*—Benjamin Hersh
*Assistant Examiner*—Robert R. Song
*Attorney*—W. E. Finken et al.

[57] ABSTRACT

A control belt system for a vehicle body occupant restraining belt arrangement including a restraining belt whose ends are respectively fixed adjacent upper and lower inboard portions of a vehicle body seat and whose intermediate portion is slidably received within a first apertured member to define lap and shoulder belt portions. The control belt system includes a first control belt with one end attached to the first apertured member, a door mounted retractor normally retracting the other end of the first control belt which maintains the belt arrangement in an occupant restraining position when the door is in closed position and provides a direct path of force between the retractor and the lap and shoulder belt portions, a second apertured member slidable along an intermediate portion of the first control belt, and a second control belt with one end extending between the vehicle body and an upper forward portion of the door in a tackle arrangement and with the other end attached to the second apertured member. During door opening movement, the tackle arrangement is lengthened to retract the other end of the second control belt as the second apertured member slides along the first control belt and moves the belt arrangement forwardly to an easy-enter position.

1 Claim, 3 Drawing Figures

PATENTED APR 17 1973
3,727,944
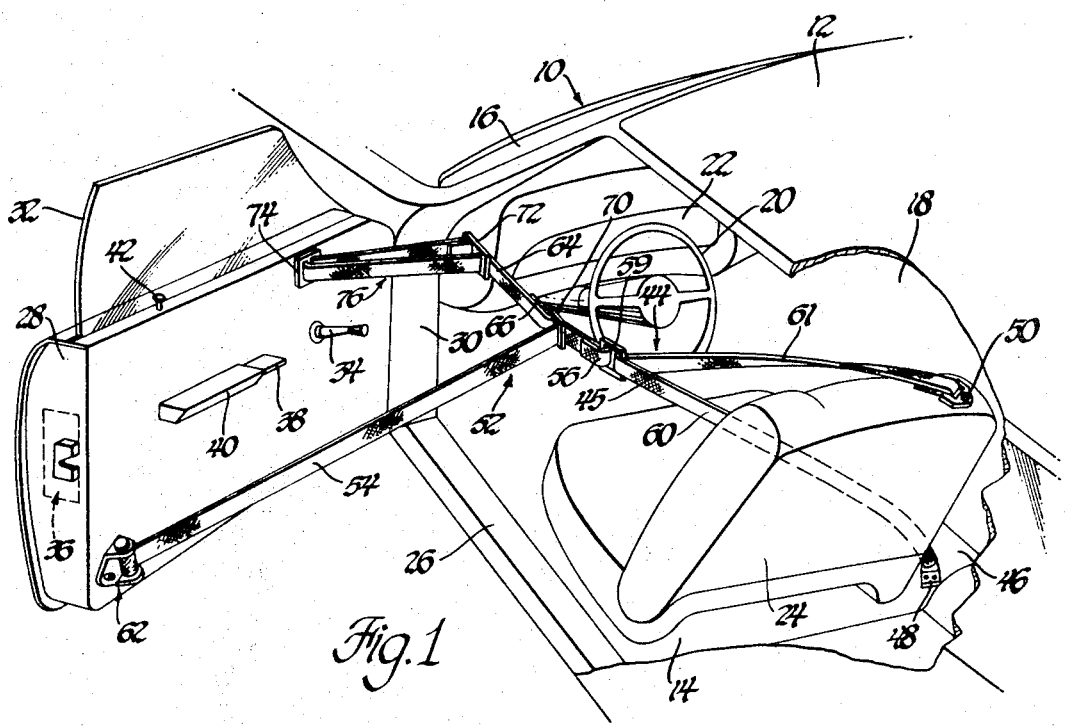
Fig.1
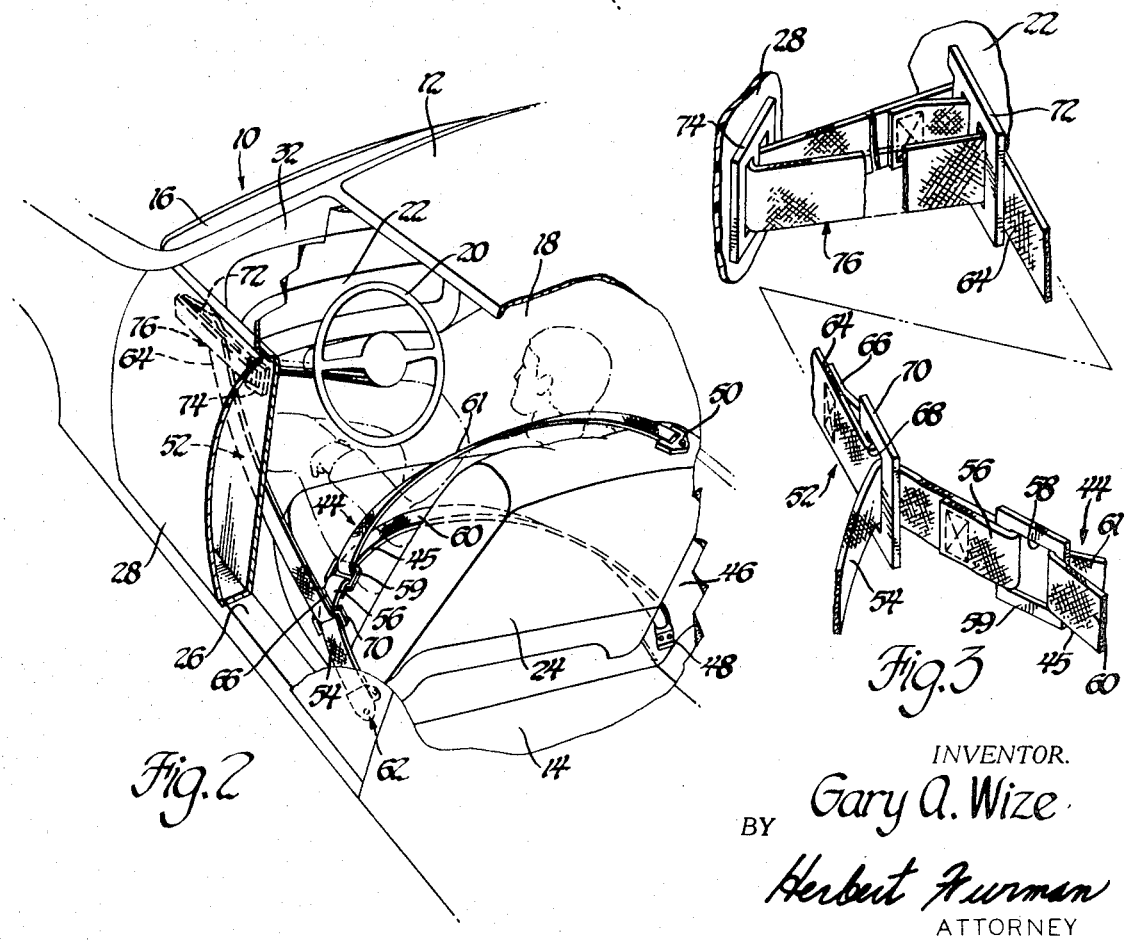
Fig.2
Fig.3
INVENTOR.
Gary A. Wize
BY
Herbert Furman
ATTORNEY

CONTROL BELT SYSTEM FOR A VEHICLE BODY OCCUPANT RESTRAINING BELT ARRANGEMENT

This invention relates generally to control belt systems for vehicle body occupant restraining belt arrangements including lap and shoulder belt portions and, more particularly, to such systems for moving the lap and shoulder belt portions between easy-enter and occupant restraining positions in response to door movement.

The U.S. patent application of Richard E. Fancy Ser. No. 144,524, filed on May 18, 1971 and assigned to the assignee of the present invention, discloses a control belt system for a vehicle body occupant restraining belt arrangement. The control belt system therein disclosed includes a first control belt with one end extending between a vehicle body and an associated door in a tackle arrangement. The other end of the first control belt is attached to a first apertured member slidable along an intermediate portion of an occupant restraining belt to define lap and shoulder belt portions. A second control belt of the control belt system has one end attached to a second apertured member slidable along an intermediate portion of the first control belt between the tackle arrangement and the first apertured member. The other end of the second control belt is normally retracted by a door mounted retractor to move the lap and shoulder belt portions to occupant restraining positions during door closing movement, while door opening movement lengthens the tackle arrangement and retracts the other end of the first control belt to move the belt arrangement to an easy-enter position. With this control belt system, tension applied to the occupant restraining belt portions will tension both of the control belts.

This invention provides a control belt system similar to the above-described system but with the free end of the belt from the retractor attached to the apertured member that defines the lap and shoulder belt portions, and with the free end of the control belt from the tackle arrangement secured to an apertured member slidable along the belt from the retractor.

Accordingly, one of the features of this invention is that it provides an improved control belt system for a vehicle body occupant restraining belt arrangement with a control belt from a door mounted retractor attached to an apertured member slidable along a restraining belt of an occupant restraining belt arrangement to define lap and shoulder belt portions positioned in occupant restraining positions when the door is in closed position, and with a control belt extending between the vehicle body and the door in a tackle arrangement and attached to an apertured member slidable along the control belt of the retractor to move the belt arrangement to an easy-enter position during door opening movement.

Another feature of this invention is that the control belt of the tackle arrangement is not tensioned upon tensioning of the lap and shoulder belt portions.

These and other features of this invention will be readily apparent from the following detailed description and drawings in which:

FIG. 1 is a partially broken away perspective view of a portion of a vehicle body whose door is shown in open position where a control belt system, according to this invention, maintains lap and shoulder belt portions of an occupant restraining belt arrangement in easy-enter position;

FIG. 2 is a view similar to FIG. 1 with the door shown in closed position where the control belt system maintains the lap and shoulder belt portions in occupant restraining positions; and FIG. 3 is an enlarged partially broken away view of the control belt system as when the lap and shoulder belt portions are in the easy-enter positions.

Referring now to the drawings, a vehicle body is generally indicated by 10 and includes a roof 12, a floor 14, and a windshield 16 that generally cooperate to define an occupant compartment 18. Within compartment 18, a steering wheel 20 is conventionally mounted adjacent an instrument panel 22 forward of a bucket type seat 24 mounted on floor 14 in the usual manner. Seat 24 is accessible through a vehicle body side door opening 26 selectively opened and closed by a door 28 whose forward edge is pivoted to a front body pillar 30 in a conventional manner by a hinge arrangement that is not shown. Door 28 supports a conventional side window 32 selectively raised and lowered by a window regulator handle 34. A conventional door lock assembly whose general outline is shown in FIG. 1 by phantom lines is indicated at 36 and includes the usual latch mechanism movable to a latched position to engage a vehicle body mounted keeper, not shown, and maintain the door 28 in closed position. An inside remote release handle 38 mounted forward of an armrest 40 is conventionally actuatable to unlatch the door lock assembly 36 when a garnish button 42 or an outside key cylinder, not shown, positions the lock mechanism of the lock assembly in an unlocked position.

An occupant restraining belt arrangement generally indicated at 44 includes a restraining belt 45 with one end secured to the vehicle floor transmission tunnel 46 by an attachment 48 slightly inboard and adjacent a rear portion of seat 24. The other end of belt 45 is secured to an inboard upper portion of the seat back of seat 24 by an attachment 50. It is also possible for attachment 50 to secure the other end of belt 45 to a generally central portion of the roof 12, such as adjacent the vehicle dome light.

A control belt system, according to this invention, is generally indicated at 52 and includes a first control belt 54 with a looped end 56 sewn to itself and received within an aperture 58, see FIG. 3, in a first apertured member 59. Apertured member 59 also receives an intermediate portion of restraining belt 45 to define lap and shoulder belt portions 60 and 61. The other end of belt 54 is received by a rotatable reel of a door mounted belt retractor 62. Retractor 62 is of the same type and functions in the same manner as the door mounted retractor described in the aforementioned Fancy application and, as such, will not be herein further described except to say that the rotatable reel of the retractor is locked against belt extending movement when the latch mechanism of lock assembly 36 is in the latched position with the door in closed position and the release handle 38 unactuated, and that the reel is unlocked to allow extending movement of belt 54 when release handle 38 is partially actuated with the door still closed or fully actuated with the door opened. The control belt system 52 also includes a second control belt 64 which has a looped end 66 sewn to itself and received within an aperture 68, see FIG. 3, in a second apertured member 70 which slidably receives an intermediate portion of belt 54. The other end of belt 64 extends between body and door mounted slide members 72 and 74 in a tackle arrangement generally indicated by 76. Tackle arrangement 76 is similar to the tackle arrangement also disclosed in the aforementioned Fancy application.

During opening movement of the door 28 from the FIG. 2 closed position, retractor 62 extends belt 54 and the slide member 74 moves away from slide member 72 to lengthen tackle arrangement 76 and retract the looped end 66 of belt 64. This retraction moves the apertured member 70 forwardly as it slides along belt 54 and moves the lap and shoulder belt portions 60 and 61 to the FIG. 1 easy-enter position. During door closing movement from the FIG. 1 open position, the normal retracting bias of retractor 62 retracts belt 54 as the slide member 74 moves toward the slide member 72 and shortens the tackle arrangement. The looped end 66 of belt 64 is thus extended from the tackle arrangement during the door closing movement and the lap and shoulder belt portions 60 and 61 are moved to occupant restraining positions without any deliberate effort on the part of the occupant. With the door 28 in closed position, belt 54 supplies a direct path of force to the apertured member 59 from the retractor 62 and tension applied to the lap and shoulder belt portions does not tension control belt 64.

The invention thus provides an improved control belt system for a vehicle body occupant restraining belt arrangement.

What is claimed is:

1. In combination with a vehicle body including a seat, a door mounted for forwardly pivoting movement between open and closed positions with respect to a body opening adjacent the seat, and an occupant restraining belt arrangement with a restraining belt whose ends are respectively fixed adjacent upper and lower inboard portions of the seat and whose intermediate portion slidably receives a first apertured member to define lap and shoulder belt portions, a control belt system comprising, a first control belt with one end attached to the first apertured member, a door mounted retractor including a rotatable reel selectively locked against belt extending movement and normally retracting the other end of the first control belt to position the belt arrangement in an occupant restraining position when the door is in closed position and provide a direct path of force between the door and the lap and shoulder belt portions, a second apertured member slidable along an intermediate portion of the first control belt, and a second control belt with one end extending between the vehicle body and an upper forward portion of the door in a tackle arrangement and with the other end attached to the second apertured member, the tackle arrangement lengthening during door opening movement to retract the other end of the second control belt as the second apertured member slides along the first control belt and moves the belt arrangement forwardly to an easy-enter position.

* * * * *